(12) United States Patent
Mohan et al.

(10) Patent No.: US 8,680,789 B2
(45) Date of Patent: Mar. 25, 2014

(54) CONTROLLING A PARAMETER OF A DEVICE THROUGH QUALIFIED MOTION SENSING

(71) Applicants: Tanuj Mohan, Mountain View, CA (US); Premal Ashar, Sunnyvale, CA (US)

(72) Inventors: Tanuj Mohan, Mountain View, CA (US); Premal Ashar, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

(21) Appl. No.: 13/862,391

(22) Filed: Apr. 13, 2013

(65) Prior Publication Data

US 2013/0221860 A1    Aug. 29, 2013

Related U.S. Application Data

(63) Continuation of application No. 12/943,199, filed on Nov. 10, 2010, now Pat. No. 8,461,778.

(51) Int. Cl.
*H05B 41/36* (2006.01)

(52) U.S. Cl.
USPC ............ 315/307; 315/291; 315/308; 315/312

(58) Field of Classification Search
USPC ............ 315/185 R, 192, 193, 210, 291, 294, 315/297, 307, 308, 312, 313, 362
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,349,330 A | 9/1994 | Diong et al. | |
| 5,812,422 A | 9/1998 | Lyons | |
| 5,903,217 A * | 5/1999 | Stanczak et al. | 340/554 |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 | 6/2009 | Lys et al. | |
| 7,566,137 B2 | 7/2009 | Veskovic | |
| 7,623,042 B2 | 11/2009 | Huizenga | |
| 7,792,956 B2 | 9/2010 | Choong et al. | |
| 7,925,384 B2 | 4/2011 | Huizenga et al. | |
| 2004/0002792 A1 | 1/2004 | Hoffknecht | |
| 2005/0169643 A1 | 8/2005 | Franklin et al. | |
| 2006/0271678 A1 * | 11/2006 | Jessup et al. | 709/224 |
| 2006/0275040 A1 | 12/2006 | Franklin | |
| 2007/0057807 A1 | 3/2007 | Walters et al. | |

(Continued)

*Primary Examiner* — Douglas W Owens
*Assistant Examiner* — Jianzi Chen
(74) *Attorney, Agent, or Firm* — Brian R. Short

(57) ABSTRACT

Methods and apparatuses for controlling a parameter of a device through motion sensing are disclosed. One apparatus includes a motion sensor for sensing a first instance of motion. The apparatus further includes a controller interfaced to the motion sensor and the device, wherein the controller is operative to activate the light only if consecutive instances of motion are sensed, wherein each instance is sensed within a gap of time of a previously sensed instance of motion, and the consecutive instances of motion being sensed span an entire window of time after sensing the first instance of motion.

10 Claims, 8 Drawing Sheets

(56) References Cited

U.S. PATENT DOCUMENTS

| | | |
|---|---|---|
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0273500 A1 | 11/2007 | Chiu |
| 2008/0185977 A1 | 8/2008 | Veskovic et al. |
| 2008/0244104 A1 | 10/2008 | Clemente |
| 2008/0265796 A1* | 10/2008 | Null et al. ............ 315/291 |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2011/0031897 A1 | 2/2011 | Henig et al. |
| 2011/0187271 A1 | 8/2011 | Bouws et al. |

* cited by examiner

CONTROLLING A PARAMETER OF A DEVICE THROUGH QUALIFIED MOTION SENSING

RELATED APPLICATIONS

This patent application is a continuation of U.S. patent application Ser. No. 12/943,199, filed Nov. 10, 2010.

FIELD OF THE EMBODIMENTS

The described embodiments relate generally to motion sensing. More particularly, the described embodiments relate to methods, apparatuses and systems for controlling a parameter of a device through qualified motion sensing.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers. Additionally, if these systems include intelligence, they are generally centrally controlled. Central control typically interprets Boolean (for e.g. contact closure) inputs from sensors and reacts according to pre-configured settings.

Existing solutions for providing activation of lights through sensing of motion are limited in intelligence. For example, lights that are located within offices can be equipped with motion sensors that, on detection of motion, turn on the lights for a fixed, manually adjustable, amount of time. This type of motion sensing has no way of adapting to false triggers (for example, an occupant walking past in a corridor (hallway) right outside a private office), or adaptively increasing sensitivity and an active light interval for an occupant that is very still or is invisible (for example behind a large monitor) to the motion sensor.

Solutions for the open-areas typically include motion sensors associated with a zone of light fixtures. The motion sensors are often placed at an entry to the open-areas or central to the zone in the ceiling and, once triggered, turns the light on based on a timer. These timers during weekdays cause the zone to be lit for the entire duration of the normal working hours. Turning all fixtures on and off in a zone is typically not practical because the motion sensors do not have granular visibility of the zone and occupants in neighboring zones are affected by constant light changes.

Within open-areas, corridors often have the same light fixtures as the rest of the floor providing more than required foot-candle levels for an area used primarily for walking. Applying existing motion based techniques in frequently traveled areas can be particularly distracting to occupants in adjacent areas, for example, cubicles and offices.

It is desirable to have a lighting method, apparatus and system for intelligent control of distributed lighting and devices that provides user-friendly lighting and environmental control in and around well traveled areas.

SUMMARY

One embodiment includes a method of controlling a parameter of a device through motion sensing. The method includes sensing a first instance of motion. The device is activated only if consecutive instances of motion are subsequently sensed, wherein each instance is sensed within a gap of time of a previously sensed instance of motion, and the first instance of motion is followed by a sequence of the consecutive instances of motion.

Another embodiment includes an apparatus for controlling light intensity of a device through motion sensing. The apparatus includes a motion sensor for sensing a first instance of motion. The apparatus further includes a controller interfaced to the motion sensor and the device, the controller operative to activate the light only if consecutive instances of motion are sensed, wherein each instance is sensed within a gap of time of a previously sensed instance of motion, and the consecutive instances of motion being sensed span an entire window of time after sensing the first instance of motion.

Another embodiment includes an apparatus for controlling parameter of a device through motion sensing. The apparatus includes a motion sensor for sensing a first instance of motion, and a controller interfaced to the motion sensor and the device, the controller operative to activate the device only if consecutive instances of motion are sensed, wherein each instance is sensed within a gap of time of a previously sensed instance of motion, and the first instance of motion is followed by a sequence of the consecutive instances of motion.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for intelligent motion sensing light control. The intelligent motion sensing control allows for power savings, while realizing motion detection light control that is user friendly. The techniques of interpreting motion (intelligent motion sensing) can also be extended to HVAC (heating and cooling) control in a building.

Figure 1:
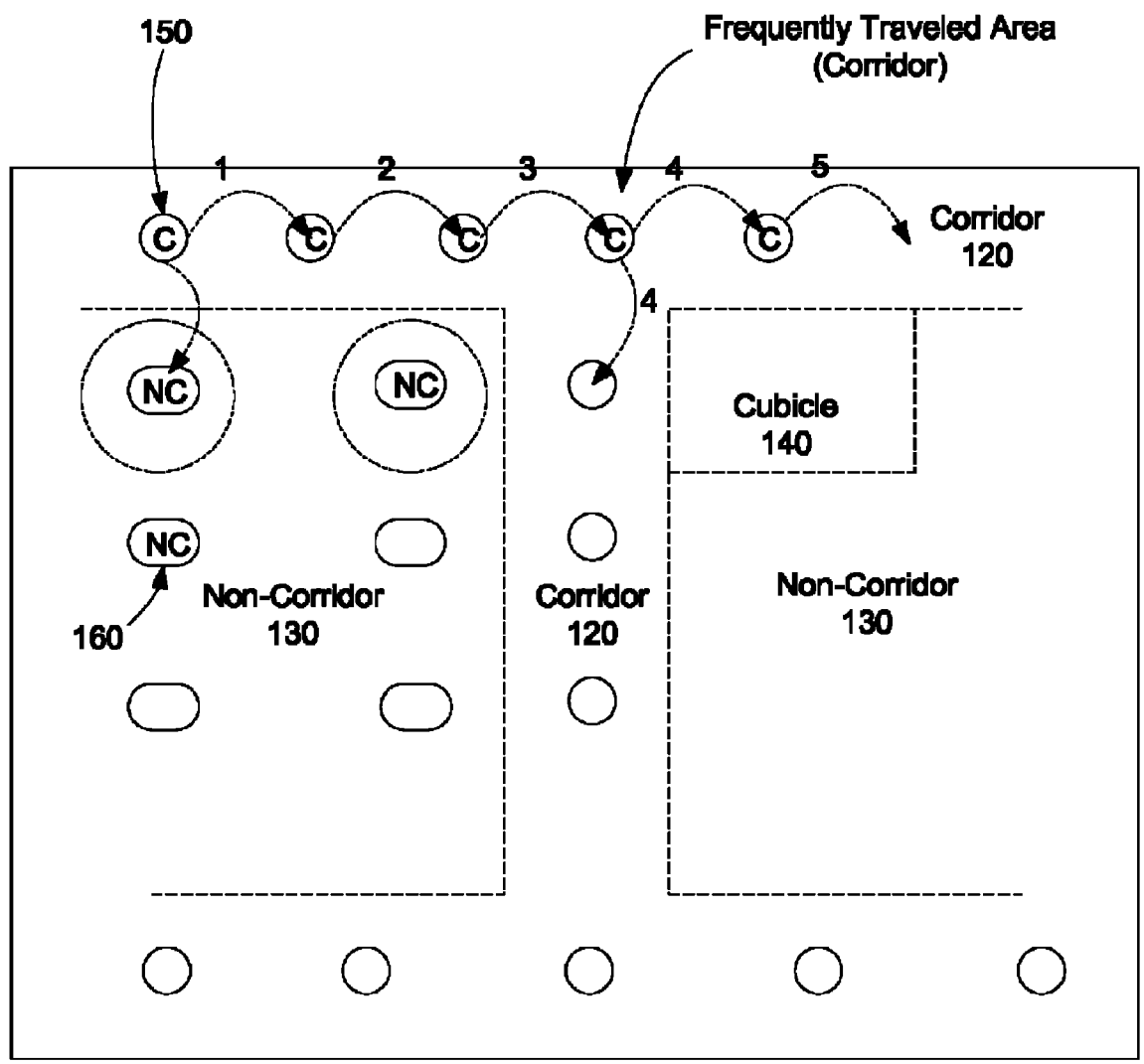
FIG. 1 shows an example of distributed lighting within a frequently traveled area.

FIG. 1 shows an example of distributed lighting control within a corridor, and outside of the corridor. FIG. 1 shows an example of a floor plan located, for example, within a business. The floor plan includes areas designated as corridors 120, and non-corridors 130. A corridor 120 is, for example, an area of the floor plan that get a large amount of foot traffic, such as, a hallway or a stairwell. The non-corridor areas include, for example, cubicles located within the floor plan. Due to the large amount of foot traffic typically experienced by corridors 120, the lighting of the corridors can reasonably be treated differently than non-corridors. Embodiments of the control of both the corridor and non-corridor lights are directed to provide a pleasant user experience, and reduce power use.

Existing methods of activating light include motion detectors that activate one or more lights upon detecting motion. However, for an individual located, for example, in a cubicle 140, constant foot-traffic of the corridors 120 can be very annoying as lights within the corridors 120 constantly turn on and off or dim and brighten. It is desirable to only activate the corridor lights when a user is "lingering" through, for example, a corridor, rather than quickly passing through.

Motion activated light, however, should be adaptive to light levels as well. For example, if the previously described corridors are receiving a sufficient amount of light, then the lights may not need to be activated. For example, on a sunny day, the corridors may have sufficient light for users to comfortably travel within, and therefore, the corridor light may not need to be activated.

Figure 2:
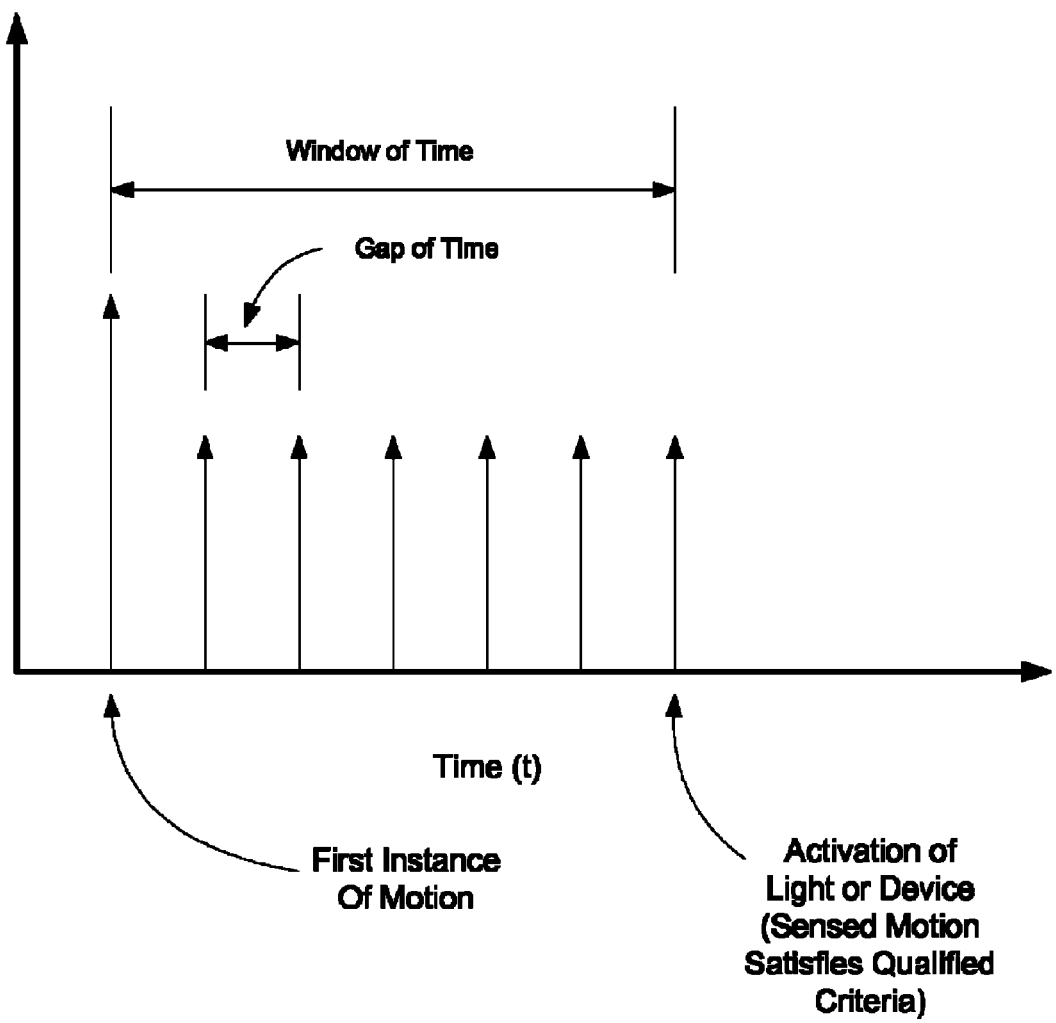
FIG. 2 shows an example of a time line showing a sequence of sensed motion that qualify for activating an associated light.

FIG. 2 shows an example of a time line showing a sequence of sensed motion that qualify for activating a light. By triggering activation of a light off of a sequence of motions, constant activating and de-activating of frequently traveled areas can be mitigated. That is, the lights within frequently traveled areas activate their lights only when an occupant "lingers" within the area as opposed to "passing through". Therefore, other occupants that are physically located near to the frequently traveled areas are not bothered with nearby frequently traveled area lights constantly activating and deactivating.

As shown in FIG. 2, a first arrow represents a first instance of detected motion. While a typical motion activated light will "power up" upon the first instance of detected motion, the embodiment depicted in FIG. 2 does not activate unless the first instance of detected motion is followed by a sequence of additional sensed motion, wherein each following instance is sensed within a gap of time of a previously sensed instance of motion, and the consecutive instances of motion being sensed span an entire window of time after sensing the first instance of motion. The sequence provides a validation that the occupant that is triggering the motion detection is in fact still present and not merely passing through the location of the motion sensor and associated light. It is to be understood the activation of the light can mean powering the light up, or increasing the light intensity of the light. For an embodiment, if a light sensor associated with the light indicates that the ambient light around the light is great enough, then the light may not activate. For another embodiment, if the light sensor indicates that the light level is below a threshold (that is, for example, completely dark) then the light can activate upon first motion sensing, for the comfort and safety of the occupant.

Figure 3:
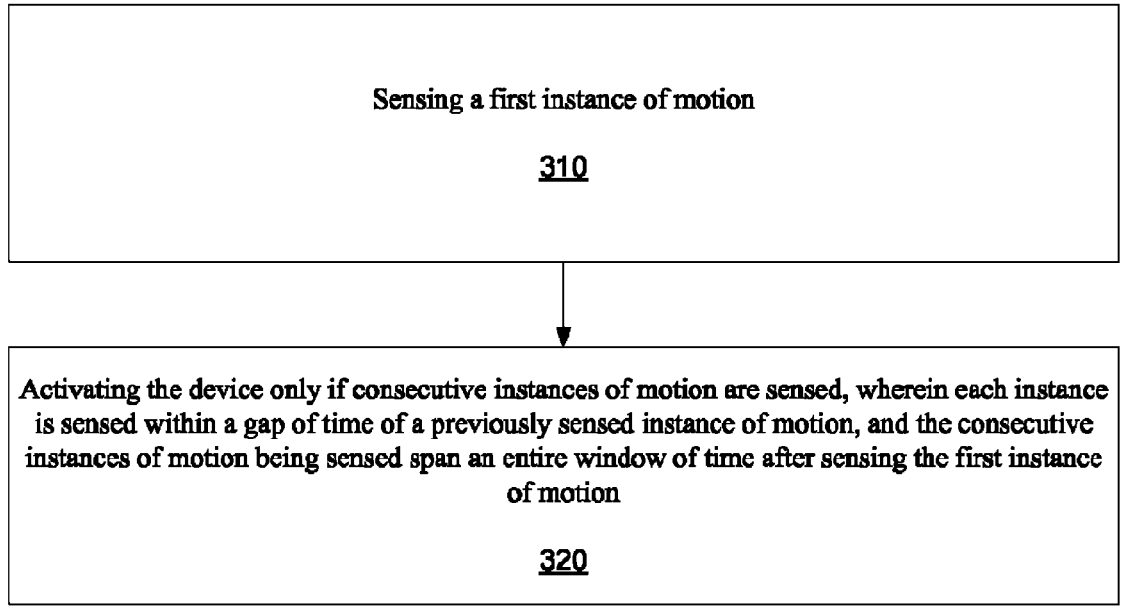
FIG. 3 is a flow chart that includes the steps of an example of a method of controlling light intensity of a light through motion sensing.

FIG. 3 is a flow chart that includes the steps of an example of a method of controlling a parameter of a device (such as a light or an HVAC system) through motion sensing. A first step 310 includes sensing a first instance of motion. A second step 320 includes activating the device (or a parameter of the device) only if consecutive instances of motion are sensed, wherein each instance is sensed within a gap of time of a previously sensed instance of motion, and the consecutive instances of motion being sensed span an entire window of time after sensing the first instance of motion.

For an embodiment, the device includes a light which is activated for a light activation time period. For an embodiment, the device includes an HVAC system which is activated for an activation time period. The light activation time period is a predetermined (for example, a weekday, weekend, holiday—time of day dependent) amount of time in which the light associated with the motion sensor is activated. For an embodiment, if the light is activated, and another qualified sequence of sensed motion is detected, then the light activation time period is re-started, thereby extending the time period in which the light is activated. Further, during the period of light activation, the sensitivity to motion detection is increased by reducing the previously described window of time. This embodiment advantageously provides user-friendly operation. More specifically, for a user's individual office, this motion detection embodiment ignores passerby type of motion (due to the low-sensitivity provided by the initial window of time). When the user enters the user's office, this motion detection embodiment reacts slowly to confirm the user's continuous presents (unless dark) by the user's motion satisfying the required motion detection sequence. Slight motion (short duration) extends the light activation time due to the increased sensitivity (due to the high-sensitivity provided by the reduced window size).

For an embodiment, the intensity of the light is ramped down before an end of the light activation time-period. Additionally, for an embodiment, if activating of the light due to sensed motion is determined during the ramping down of intensity of the light, then the light activation time-period is increased. The light is ramped down in intensity to allow a user to detect that the light is going to deactivate soon. The user can then re-activate the light through coordinated motion of the user. Upon reactivation, the activation time period is increased because the user is located proximate to the light, but was not reactivating the motion detection sequence. Therefore, the activation time period is extended for the convenience of the user. The motion sensing embodiment addresses situations associated with very still (little motion) or a "sensor invisible" user. That is, this embodiment adaptively increases sensitivity and the active light interval for an occupant that is very still or is invisible (for example behind a large monitor) to the motion sensor.

An embodiment includes sensing an intensity of light near the light before sensing the first instance of motion. If the intensity of light is below a threshold, then the light is activated upon detecting the first instance of motion. Another embodiment includes suppressing activation of the light if the intensity of light is above a threshold.

For an embodiment, the light sensor ignores ambient changes at night (for example, light from a vehicle headlight). Additionally, the light sensor has a time and preference based reactivity scale associated with it. The reactivity scale limits the dimming behavior based on environmental (for example, angle of sunlight, time of day) and human perception. A human whose pupils are constricted (due to bright lights etc.) perceives the same light levels differently than someone whose pupils are dilated. A 0 to N scale settings allows fixtures to not dim at a '0' setting and go off at 'N' setting. Consider, for example, two similar offices with one occupant facing the window the other with his back to the window. The one with his back to the window might have the setting of 'N' allowing his light fixtures to go off when sufficient ambient light is present. The other might set it at 'N/2' allowing the fixtures to only dim 50% so that he is comfortable.

Figure 4:
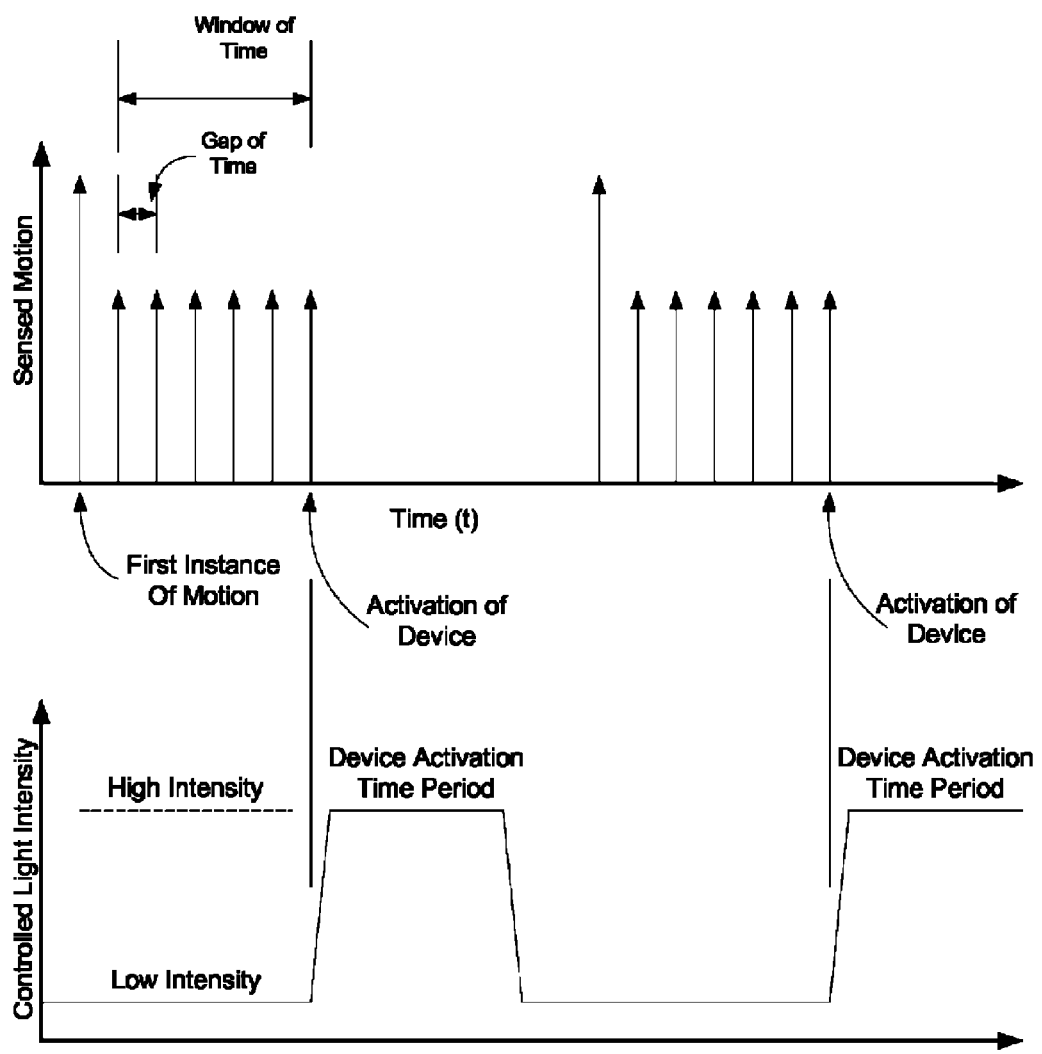
FIG. 4 shows an example of a time line that includes a couple of sequences of sensed motion that each qualify for activating a light.

FIG. 4 shows an example of a time line that includes a couple of sequences of sensed motion that each qualify for activating a light. These sequences are merely two of the qualified activation sequences of FIG. 2. However, a second time-line shows activation of the light associated with the motion sensor. As shown, the light is set for a low-intensity (typically, off) before activation. Upon detection of the qualified sequence of motion detection, the light (device) is activated to a high-level of intensity. The light (device) then remains active for the activation time period. At the end of the period, the light (device) then deactivates and returns to the low-intensity state. Upon detection of another qualified sequence of sensed motion, the light again reactivates for the light activation time period.

Figure 5:
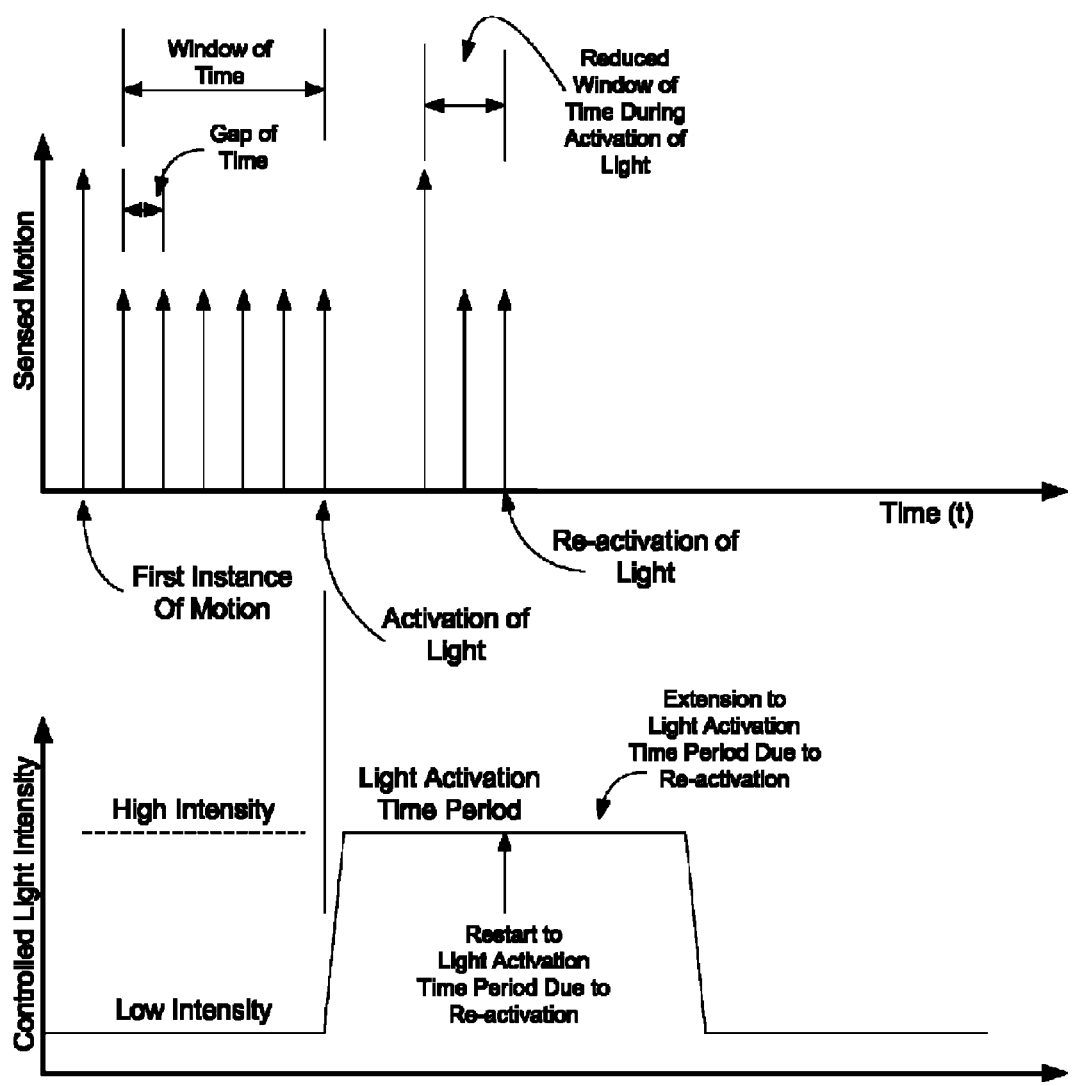
FIG. 5 shows an example of a time line that includes a couple of sequences of sensed motion that qualify for activating a light that have different sensitivities due to the light being activated or not.

FIG. 5 shows an example of a time line that includes a couple of sequences of sensed motion that qualify for activating a light that have different sensitivities due to the light being activated or not. The primary features being additionally conveyed in FIG. 5 include an increase in the motion sensitivity during the light activation time period, and the restarting of the light activation time period when a qualified sequence of motions are sensed during the light activation time period.

Considering, for example, an office adjacent to a corridor, as people (users) travel through the corridor, the motion activation may be triggered. As described, to prevent a constant activation and deactivation of lights within the corridor, the motion sensing is desensitized. However, once a person enters, for example, an office (such as cubicle or office 140) the light activation time period should extend, and the motion sensing should become more sensitive (by, for example, decreasing the motion detection window). As the user is sitting in his office, slight occasional motion should re-active the lighting control.

As shown, a first qualified sequence of sensed motion activates the light associated with the light sensor. During the light activation time period (while the light is on) the window of time is reduced, resulting in the motion sensing being more sensitive. That is, a fewer number of instances of motion detection each within the previously described gap of time previous detected motion are required to reactivate the light. Upon reactivation, the light activation time period is extending by restarting the activation time period at the time of the later detected qualified sequence of sensed motion.

Figure 6:
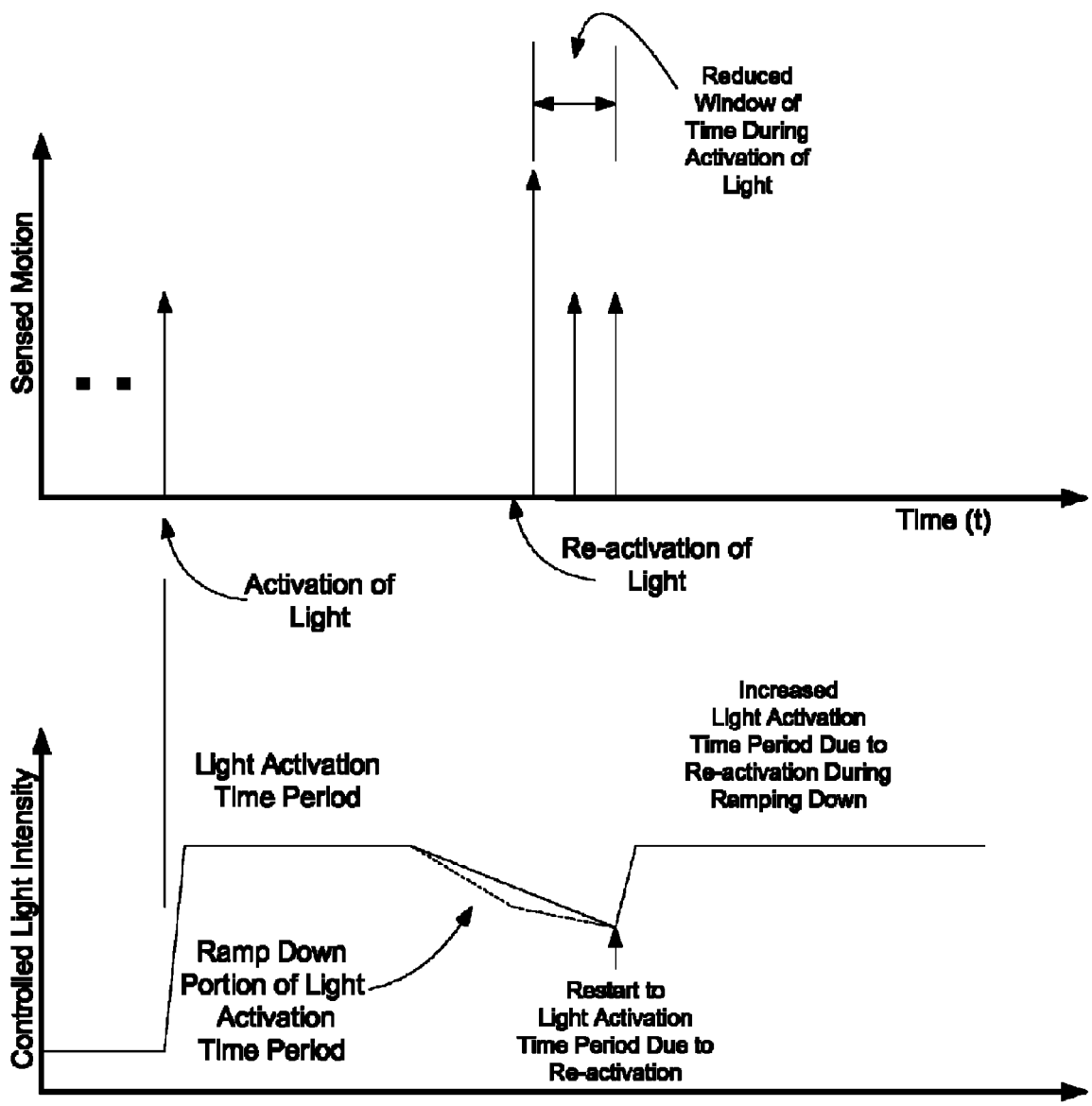
FIG. 6 shows an example of a time line that includes a couple of sequences of sensed motion that qualify for activating a light, and differing resulting light activation time periods.

FIG. 6 shows an example of a time line that includes a couple of sequences of sensed motion that qualify for activating a light, and differing resulting light activation time periods. The primary feature additionally depicted in FIG. 6 is that if during a ramping down of the intensity of the light a qualified sequence of motion is detected, the light activation time period is extended.

As shown, for this embodiment, the light intensity is ramped down in intensity before the end of the light activation time period. As previously described, an embodiment includes the sensitivity of the motion detection being increased during the light activation time period. As shown, if a qualified sequence of motion is detected during the ramping down portion of the light activation time period, the light activation time period is increased.

If, for example, a user is sitting in a cubicle 140 that has high walls, the motion sensor may not detect his motion. If the ramp-down period begins, the user can reactivate the motion sensing by a "hand wave". However, this sequence of events indicates that the user is "hidden" from the sensor, and therefore, the light activation time period is increased for the convenience and comfort of the user.

Figure 7:
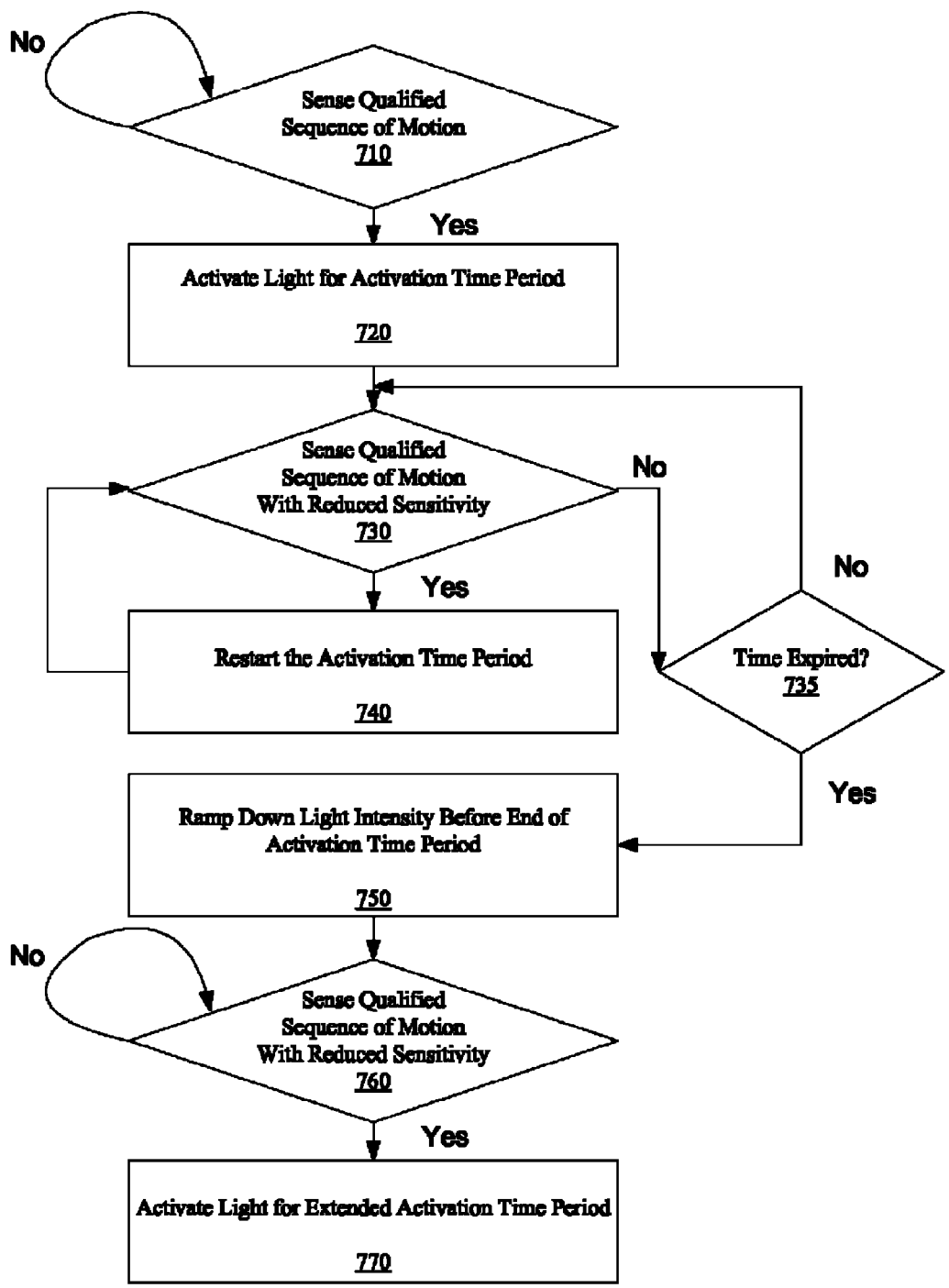
FIG. 7 is a flow chart that includes the steps of an example of another method of controlling light intensity of a light through motion sensing.

FIG. 7 is a flow chart that includes the steps of an example of another method of controlling light intensity of a light through motion sensing. A first step 710 includes sensing a quality sequence of motions. Upon sensing the qualified sequence of motions, a second step 720 includes activating the light for the light activation time period. A third step 730 includes determining if another qualified sequence of motion (which is more sensitive when the light is activated) is sensed. A fourth step 740 includes restarting the light activation time period upon sensing the other qualified sequence of motion. A step 735 includes determining whether the light activation time period has expired. If yes, a fifth step 750 includes ramping down the light intensity. A sixth step 760 includes sensing the qualified sequence of motion (at the more sensitive setting) during the ramp down. If the qualified sequence of motion is detected during the ramp down, a seventh step 770 includes extending the light activation time period.

Figure 8:
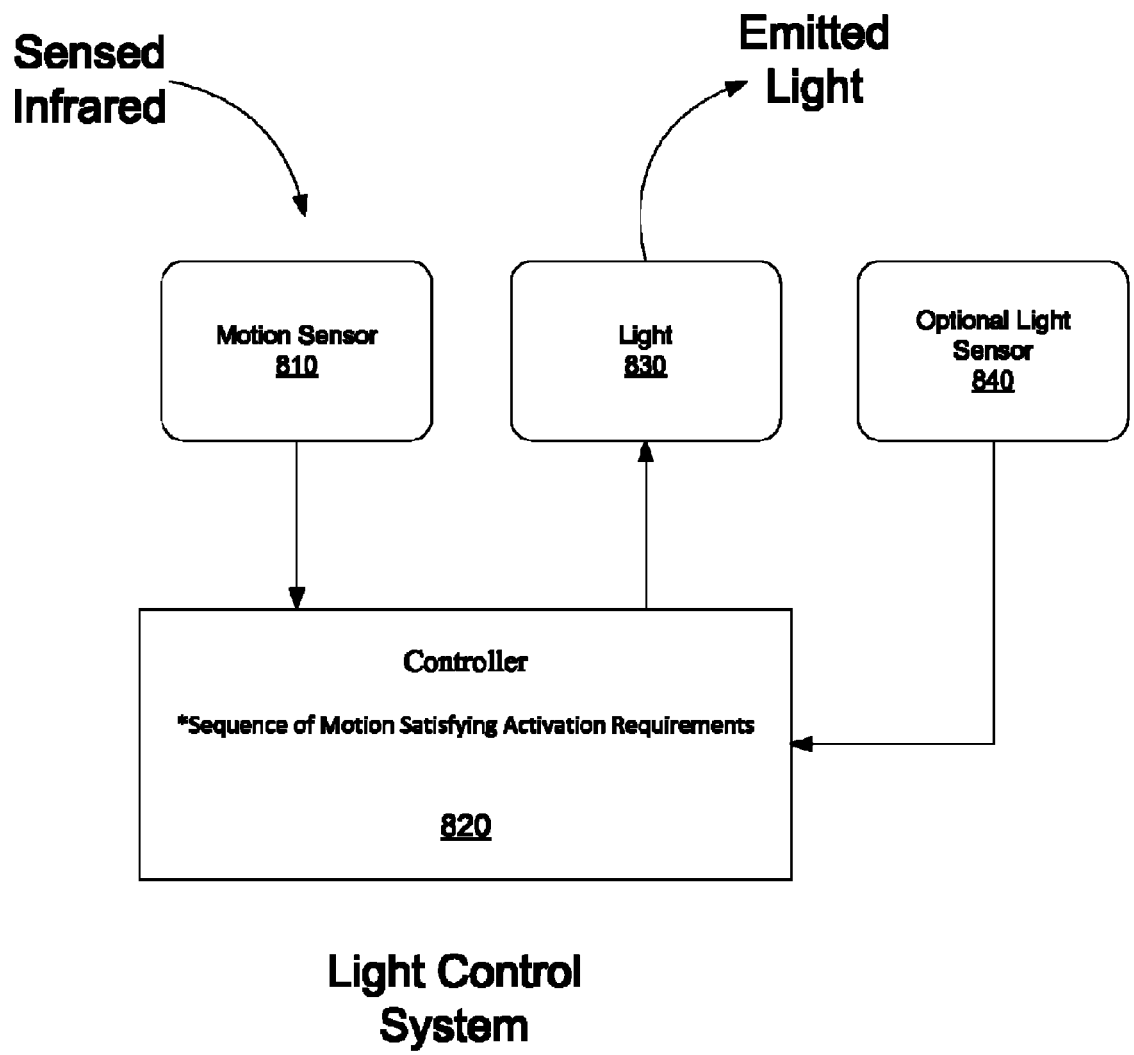
FIG. 8 shows an example of a system that includes a motion sensor, a light and a controller operative to control light intensity of the light through described embodiments for motion sensing.

FIG. 8 shows an example of a system that includes a motion sensor, a light and a controller operative to control light intensity of the light through motion sensing. The system of FIG. 8 can be a single apparatus that includes the sensor 810, the controller 820 and the light 830. Alternatively, any combination of the sensor 810, the controller 820 and the light 830 can be a single or separate device. Generally, the sensor 810, the controller 820 and the light 830 need to be proximate for proper operation. That is, the sensor 810 should provide an accurate representation of light intensity received by the light 830. The controller 820 could be located anywhere. However, for decentralized control, it can be advantageous to have the controller 820 co-located with the sensor 810 and/or the light 830. The system can additionally include a light sensor 840 which can be used to determine, for example, that the ambient light near the light is great enough not to activate the light, or to determine that the ambient light near the light is so low that the light can be activated upon a less than qualified sequence of motion.

Although specific embodiments have been described and illustrated, the described embodiments are not to be limited to the specific forms or arrangements of parts so described and illustrated. The embodiments are limited only by the appended claims.

What is claimed:

1. A method of controlling a parameter of a device through motion sensing, comprising:
    sensing a first instance of motion;
    activating the device only if consecutive instances of motion are subsequently sensed, wherein each instance is sensed within a gap of time of a previously sensed instance of motion, and the first instance of motion is followed by a sequence of the consecutive instances of motion;
    wherein the device comprises a light, and further comprising sensing an intensity of light before sensing the first instance of motion, and if the intensity of light is below a threshold, then activating the light upon detecting the first instance of motion.

2. The method of claim 1, wherein the parameter includes a light intensity.

3. The method of claim 1, further comprising activating the device for an activation time period.

4. The method of claim 3, wherein the activation time period is re-started for subsequent determinations of activating the device due to sensed motion during the activation time period.

5. The method of claim 3, further comprising reducing the window of time if the device is within the activation time period.

6. The method of claim 1, further comprising sensing an intensity of light before sensing the first instance of motion, and if the intensity of light is above a threshold, then suppressing activating the light.

7. An apparatus for controlling parameter of a device through motion sensing, comprising:
   a motion sensor for sensing a first instance of motion;
   a controller interfaced to the motion sensor and the device, the controller operative to activate the device only if consecutive instances of motion are sensed, wherein each instance is sensed within a gap of time of a previously sensed instance of motion, and the consecutive instances of motion being sensed span an entire window of time after sensing the first instance of motion, wherein the controller activates the device for an activation time period;
   wherein the device includes a light, and the controller is further operative to ramp down intensity of the light before an end of the activation time-period.

8. The apparatus of claim 7, wherein the parameter includes a light intensity.

9. The apparatus of claim 7, wherein the activation time period is re-started for subsequent determinations of activating the device due to sensed motion.

10. The apparatus of claim 7, further comprising reducing the window of time if the device is within the activation time period.

* * * * *